US012451107B2

(12) United States Patent
Bergada Bombi

(10) Patent No.: US 12,451,107 B2
(45) Date of Patent: Oct. 21, 2025

(54) SENSOR MODULE, SYSTEM OF MODULES FOR A PIANO KEYBOARD, AND CORRESPONDING METHOD

(71) Applicant: POCKETPIANO, S.L., Barcelona (ES)

(72) Inventor: Josep Bergada Bombi, Barcelona (ES)

(73) Assignee: POCKETPIANO, S.L., Barcelona (ES)

( * ) Notice: Subject to any disclaimer, the term of this patent is extended or adjusted under 35 U.S.C. 154(b) by 0 days.

(21) Appl. No.: 18/055,382

(22) Filed: Nov. 14, 2022

(65) Prior Publication Data

US 2023/0098657 A1 Mar. 30, 2023

Related U.S. Application Data

(63) Continuation of application No. 17/672,667, filed on Feb. 15, 2022, now Pat. No. 11,527,225, which is a (Continued)

(30) Foreign Application Priority Data

Dec. 13, 2019 (ES) ................................ P201931109

(51) Int. Cl.
*G10H 1/00* (2006.01)
*G10H 1/34* (2006.01)

(52) U.S. Cl.
CPC ......... *G10H 1/0066* (2013.01); *G10H 1/0008* (2013.01); *G10H 1/346* (2013.01); (Continued)

(58) Field of Classification Search
CPC .... G10H 1/0066; G10H 1/0008; G10H 1/346; G10H 1/348; G10H 2220/221; G10H 2220/275
See application file for complete search history.

(56) References Cited

U.S. PATENT DOCUMENTS 2,231,235 A 2/1941 Weir
5,590,771 A 1/1997 Cota
(Continued)

FOREIGN PATENT DOCUMENTS

CN 218647473 U 3/2023
CN 219926031 U 10/2023
(Continued)

OTHER PUBLICATIONS

M. Walker, "Which MIDI velocity curve should I use with my controller keyboard?" *Sound on Sound*, Jun. 2010 [online]. URL:https://www.soundonsound.com/sound-advice/q-which-midivelocity-curve-should-use-my-controller-keyboard.
(Continued)

*Primary Examiner* — Jianchun Qin
(74) *Attorney, Agent, or Firm* — Weaver Austin Villeneuve & Sampson LLP

(57) ABSTRACT

Different aspects of the invention implement a sensor module that can be configured as a keyboard module or as a pedal module, allowing to connect a plurality of keyboard and pedal modules to assemble a configuration to the user's liking, such as, for example, the usual configuration of an 87-key piano together with two pedals. The sensor module transmits information about detected key or pedal strokes to a computer application for playback, either aural or visual. At the same time, the sensor module allows, both in the keyboard module and pedal module configuration, to transmit the feeling of playing a real piano.

22 Claims, 11 Drawing Sheets

Related U.S. Application Data continuation of application No. PCT/ES2020/070769, filed on Dec. 5, 2020.

(52) U.S. Cl.
CPC ....... *G10H 1/348* (2013.01); *G10H 2220/221* (2013.01); *G10H 2220/275* (2013.01)

(56) References Cited

U.S. PATENT DOCUMENTS

| | | | | |
|---|---|---|---|---|
| 6,259,006 | B1 | 7/2001 | Parienti | |
| 6,875,913 | B2 | 4/2005 | Bubar | |
| D637,175 | S | 5/2011 | Terry | |
| 8,022,285 | B2 | 9/2011 | Zhang | |
| 9,263,017 | B2 | 2/2016 | Lifshitz et al. | |
| 10,714,067 | B1 * | 7/2020 | Xu | G10H 1/0066 |
| 10,783,862 | B1 | 9/2020 | Moser | |
| 10,937,405 | B1 | 3/2021 | Frahm | |
| 11,527,225 | B2 | 12/2022 | Bergada Bombi | |
| 2004/0083877 | A1 | 5/2004 | Bubar | |
| 2004/0159226 | A1 | 8/2004 | Koo | |
| 2005/0160903 | A1 | 7/2005 | Nagaoka et al. | |
| 2005/0241467 | A1 | 11/2005 | Lo | |
| 2006/0278058 | A1 | 12/2006 | Lengeling | |
| 2009/0188378 | A1 | 7/2009 | Folkesson | |
| 2009/0301289 | A1 | 12/2009 | Gynes | |
| 2010/0155347 | A1 | 6/2010 | McConnell et al. | |
| 2010/0223857 | A1 | 9/2010 | Sutton et al. | |
| 2012/0174739 | A1 | 7/2012 | Yoshimura et al. | |
| 2013/0319210 | A1 * | 12/2013 | Yoshida | G10H 1/346<br>84/745 |
| 2013/0327201 | A1 | 12/2013 | Urry et al. | |
| 2018/0007458 | A1 | 1/2018 | DeJarnette | |
| 2020/0273438 | A1 | 8/2020 | Moser | |
| 2022/0208159 | A1 | 6/2022 | Bergada Bombi | |
| 2022/0293075 | A1 | 9/2022 | Bergada Bombi | |
| 2024/0071347 | A1 | 2/2024 | Sato | |

FOREIGN PATENT DOCUMENTS

| | | | |
|---|---|---|---|
| DE | 9208106 | U1 | 9/1992 |
| DE | 4400853 | A1 | 7/1995 |
| EP | 2854129 | A1 | 4/2015 |
| EP | 3614371 | A1 | 2/2020 |
| EP | 4002348 | B1 | 3/2024 |
| JP | S60160431 | U | 10/1985 |
| JP | 2003302975 | A | 10/2003 |
| JP | 4441008 | B2 | 3/2010 |
| JP | 2015148736 | A | 8/2015 |
| WO | WO-0054479 | A2 | 9/2000 |
| WO | WO-2007120519 | A2 | 10/2007 |
| WO | WO-2010080954 | A2 | 7/2010 |
| WO | WO-2012108550 | A1 | 8/2012 |
| WO | WO-2014122642 | A1 | 8/2014 |
| WO | WO-2018173664 | A1 | 9/2018 |
| WO | WO-2018193140 | A1 | 10/2018 |
| WO | WO-2018200301 | A1 | 11/2018 |

OTHER PUBLICATIONS

Open Music Labs, "How does a MIDI keyboard work?" Apr. 8, 2016 [online]. <URL:https://www.openmusiclabs.com/learning/digital/input-matrix-scanning/keyboard/index.html>.
PCT International Search Report & Written Opinion mailed Mar. 5, 2021 (with English translation) [PCT/ES20/70769].
PCT International Search Report & Written Opinion mailed Feb. 22, 2021 (with English translation) [PCT/ES20/70768].
Pocketpiano, "PocketPiano a El Mirador | Mataró TV", Video, YouTube: https://www.youtube.com/watch?v=9VHfY-E3dC8feature=youtu.be (minutes 5:00 to 5:33), Jun. 28, 2019. [online].
U.S. Non-Final Office Action dated Jun. 20, 2022 in U.S. Appl. No. 17/672,667.
U.S. Notice of Allowance dated Aug. 15, 2022 in U.S. Appl. No. 17/672,667.
EP Extended European Search Report dated Aug. 5, 2022 in EP Application No. 20898469.0.
EP Extended European Search Report dated Aug. 25, 2022 in EP Application No. 20899182.8.
EP Notice of Allowance dated Feb. 15, 2024 in EP Application No. 20898469.0.
EP Office Action dated Dec. 7, 2022 in EP Application No. 20898469.0.
International Preliminary Report on Patentability and Written Opinion dated Jun. 13, 2022 in PCT Application No. PCT/ES20/70768.
International Preliminary Report on Patentability and Written Opinion dated Jun. 23, 2022 in PCT Application No. PCT/ES20/70769.
EP Office Action dated Apr. 24, 2024 in EP Application No. 20899182.8.
U.S. Non-Final Office Action dated Sep. 20, 2024 in U.S. Appl. No. 17/753,059.

* cited by examiner

SENSOR MODULE, SYSTEM OF MODULES FOR A PIANO KEYBOARD, AND CORRESPONDING METHOD

CROSS-REFERENCE TO RELATED APPLICATIONS

This application is a continuation of U.S. patent application Ser. No. 17/672,667, filed Feb. 15, 2022, entitled, "SENSOR MODULE, SYSTEM OF MODULES FOR A PIANO KEYBOARD, AND CORRESPONDING METHOD", which is a continuation of International Application No. PCT/ES2020/070769, filed Dec. 5, 2020, entitled "SENSOR MODULE, SYSTEM OF MODULES FOR A PIANO KEYBOARD, AND CORRESPONDING METHOD", which claims priority to and the benefit of ES Patent Application No. P201931109, filed Dec. 13, 2019, entitled "SENSOR MODULE, SYSTEM OF MODULES FOR A PIANO KEYBOARD, AND CORRESPONDING METHOD", the disclosures of which are incorporated herein by reference in their entireties.

TECHNICAL FIELD

The invention is generally located in the field of electronic musical instruments, and, in particular, to a sensor module for the assembly and disassembly of a modular electronic piano keyboard.

BACKGROUND ART

There are electronic musical instruments that reproduce a variety of sounds. Among these are electronic keyboards incorporating synthesizers that vary the intensity, frequency or phase parameters of a sound to reproduce a wide spectrum of sounds representing different instruments, from piano, violin, to drums, or virtual instruments that do not exist in the non-electronic real world.

Electronic pianos exist as well as certain high quality keyboards which reproduce a piano. A specific type of sound reproduced by these electronic keyboards is that of the piano. On the other hand, most existing modular piano keyboards do not reproduce high quality sound as a real piano. On the one hand, they fail in structural aspects, for example, not having keys that respect the actual size of the keys of a real piano or pedals. On the other hand, they do not reproduce the experience of playing a real piano. They are designed rather to cover a wide spectrum, sometimes several hundred, of different instrument sounds, and the sound quality is poor, or their fidelity to the sound of the real instrument is very low. They also do not give the user the feeling of playing a real piano, as the keys are designed simply to detect the note the user is playing when pressing them.

Among the group of piano keyboards of this style, keyboards have been developed that can be disassembled into modules for ease of transport. For these reasons, the efforts in these modular keyboards have been focused on bringing to the general public the sounds of hundreds of different instruments for playing electronic music, and therefore, by assembling the modules to form a complete keyboard, the sensation of playing an instrument that faithfully reproduces the sound, touch, or size of real piano keys is lost.

Therefore, there is a need to effectively solve these problems. The inventor has detected the need to enhanced existing modular keyboards to provide them with the ability to reproduce the full experience of playing a real piano. At the same time, their modularity allows them to be mobile, and to be played in any environment or situation. Thus allowing enjoying the sound of a high quality piano, like a grand piano, and at the same time feel like a grand piano, but without the need to transport one anywhere.

SUMMARY OF THE INVENTION

It is an object of the invention to provide solutions to the above problems. In particular, it is an object of the invention to provide a sensor module which enables the faithful reproduction of the experience of playing a real piano, and, by joining more than one module to another, to provide a modular keyboard system for playing piano.

This optimization is achieved starting from a basic module which is a sensor module. The sensor module comprises those elements that allow its connectivity to an external computer application to reproduce the keystrokes aurally or visually. It also comprises those elements that allow it to operate as a piano keyboard module, for example, a twelve-key octave. Together with those elements that allow it to be connected to other sensor modules, a multi-octave piano can be formed, for example, in one aspect, a 7-octave piano plus an additional 3-key module to form an 87-key piano. Moreover, according to its configuration, the sensor module comprises those elements that allow it to operate as a pedal module. Thus, the modularity of the configuration is optimized, from playing only one octave to seven or more octaves. This allows the user/musician to play one octave only, up to the usual configuration of a seven octave piano together with two pedals, or more units according to the user's taste. At the same time, the sensor module enables, both in the keyboard module and pedal module configuration, to transmit the feeling of playing a real piano.

It is therefore an object of the invention to provide a sensor module configurable as a piano keyboard module or a piano pedal module.

It is another object of the invention to provide a modular piano system.

It is another object of the invention to provide a method in a modular piano system.

It is another object of the invention to provide a computer program comprising instructions, which once executed on a processor, reproduce a method in a modular piano system.

It is another object of the invention to provide a computer readable means comprising instructions, which once executed on a processor, reproduce a method in a modular piano system.

The invention provides methods and devices that implement various aspects, embodiments, and features of the invention, and are implemented by various means. The various means may comprise, for example, hardware, software, firmware, or a combination thereof, and any one, or combination, of the various means may implement these techniques.

For a hardware implementation, the various means may comprise processing units implemented on one or more application specific integrated circuits (ASICs), digital signal processors (DSPs), digital signal processing devices (DSPDs), programmable logic devices (PLDs), in-place programmable gate arrays (FPGAs), processors, controllers, microcontrollers, microprocessors, other electronic units designed to perform described functions, or a combination thereof.

For a software implementation, the various means may comprise modules (for example, processes, functions, and so forth) that carry out the described functions. The software code may be stored in a memory unit and executed by a processor. The memory unit may be implemented within the processor or external to the processor.

Various aspects, configurations, and embodiments of the invention are described. In particular, the invention provides methods, methods, apparatuses, systems, processors, program code, computer-readable means, and other apparatuses and elements that implement various aspects, configurations, and features of the invention, such as described in the following.

BRIEF DESCRIPTION OF THE DRAWINGS

The features and advantages of the present invention will become more apparent from the detailed description which follows in conjunction with the drawings, in which like reference characters identify corresponding elements in different drawings. Corresponding elements may also be referenced by different characters.

DETAILED DESCRIPTION OF THE INVENTION

Figure 1:
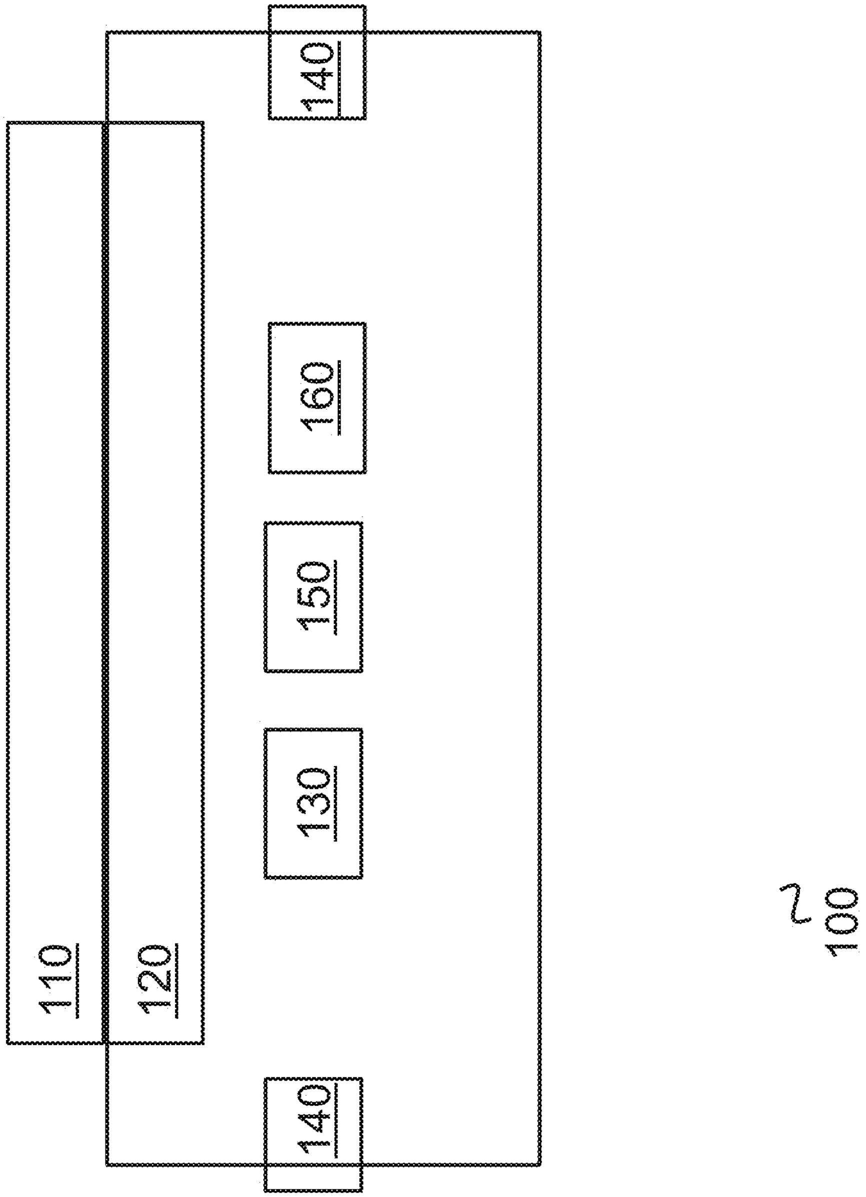
FIG. 1 shows a sensor module for faithfully reproducing a piano according to an embodiment of the invention.

FIG. 1 shows a sensor module for faithfully reproducing a piano according to an embodiment of the invention. The sensor module 100 comprises at least one push button 110, at least one membrane 120 configured to deform under the effect of pressure on the push button, and at least one processing means 130 configured to generate a signal indicative of activation of the push button. The sensor module optionally comprises visual indicators, such as LEDs, to indicate push button activation by one color and intensity of the keystroke by another degraded color, or flashing frequency.

Figure 2:
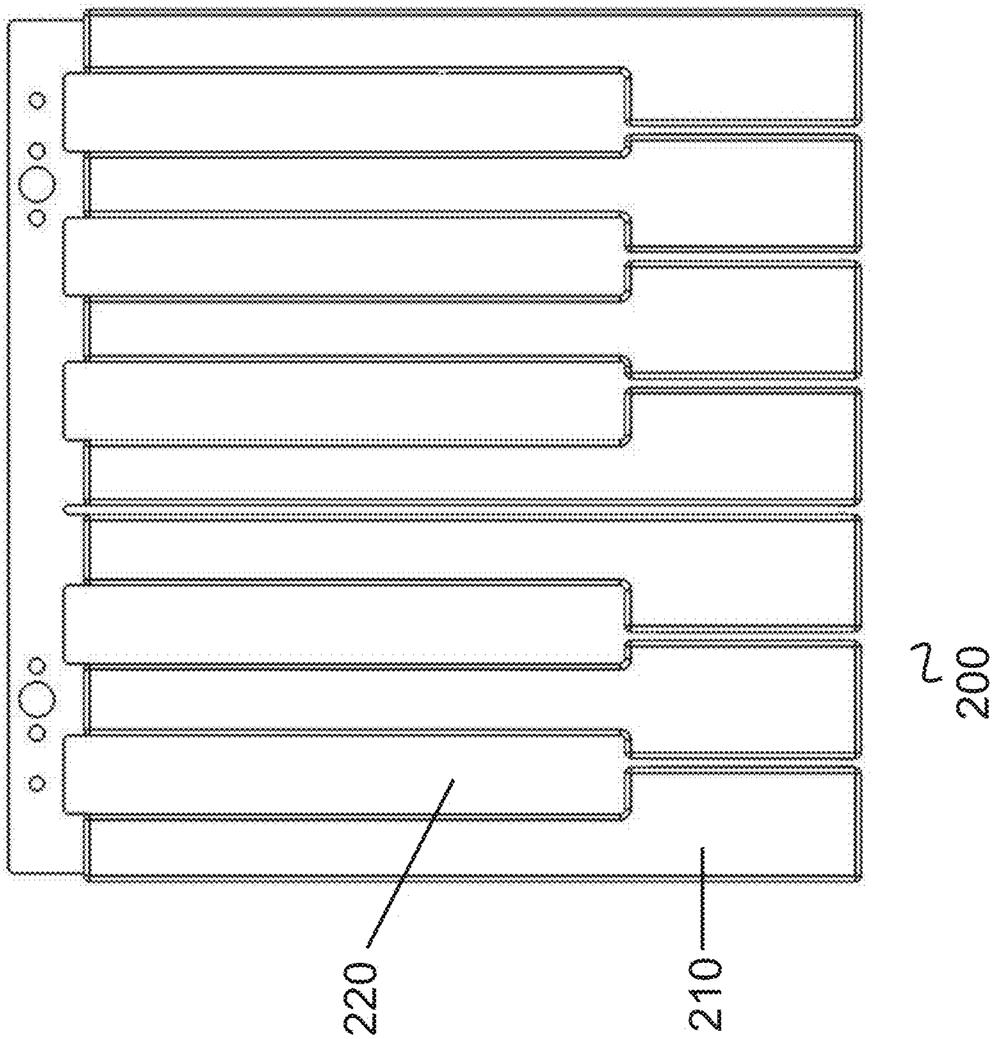
FIG. 2 shows a 12-key electronic keyboard module according to an aspect of the invention.
Figure 5B:
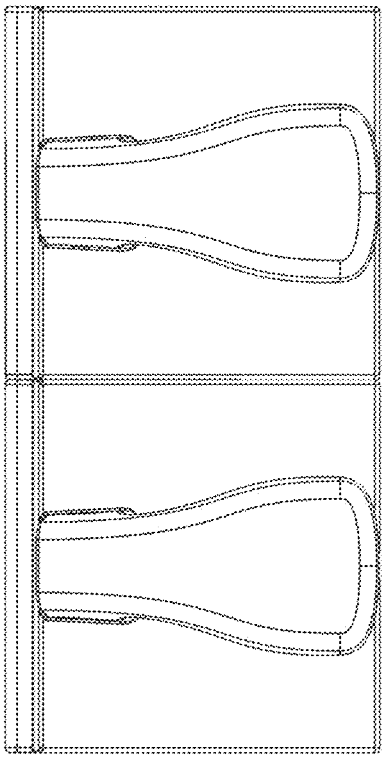
FIG. 5B shows two contiguous pedal modules according to another aspect of the invention.
Figure 5A:
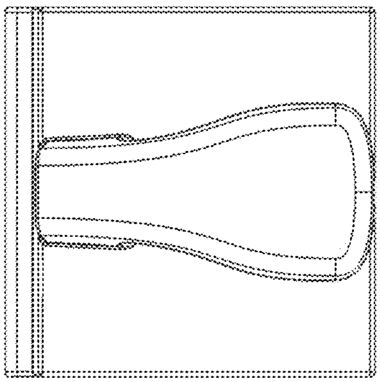
FIG. 5A shows a pedal module according to one aspect of the invention.

In one aspect, the push button represents a piano key and a plurality of piano keys comprise a keyboard module, as depicted in FIG. 2. In this aspect, the keyboard module 200 comprises twelve push buttons representing an octave, wherein seven are long push buttons 210 (usually white in color) representing natural notes and five are short push buttons 220 (usually black in color) representing accidental notes. In another aspect, the push button represents a piano pedal and the sensor module represents a pedal module, as depicted in FIG. 5A. FIG. 5B shows two pedal modules physically connected by means of connecting means comprised in the sensor modules.

Figure 3:
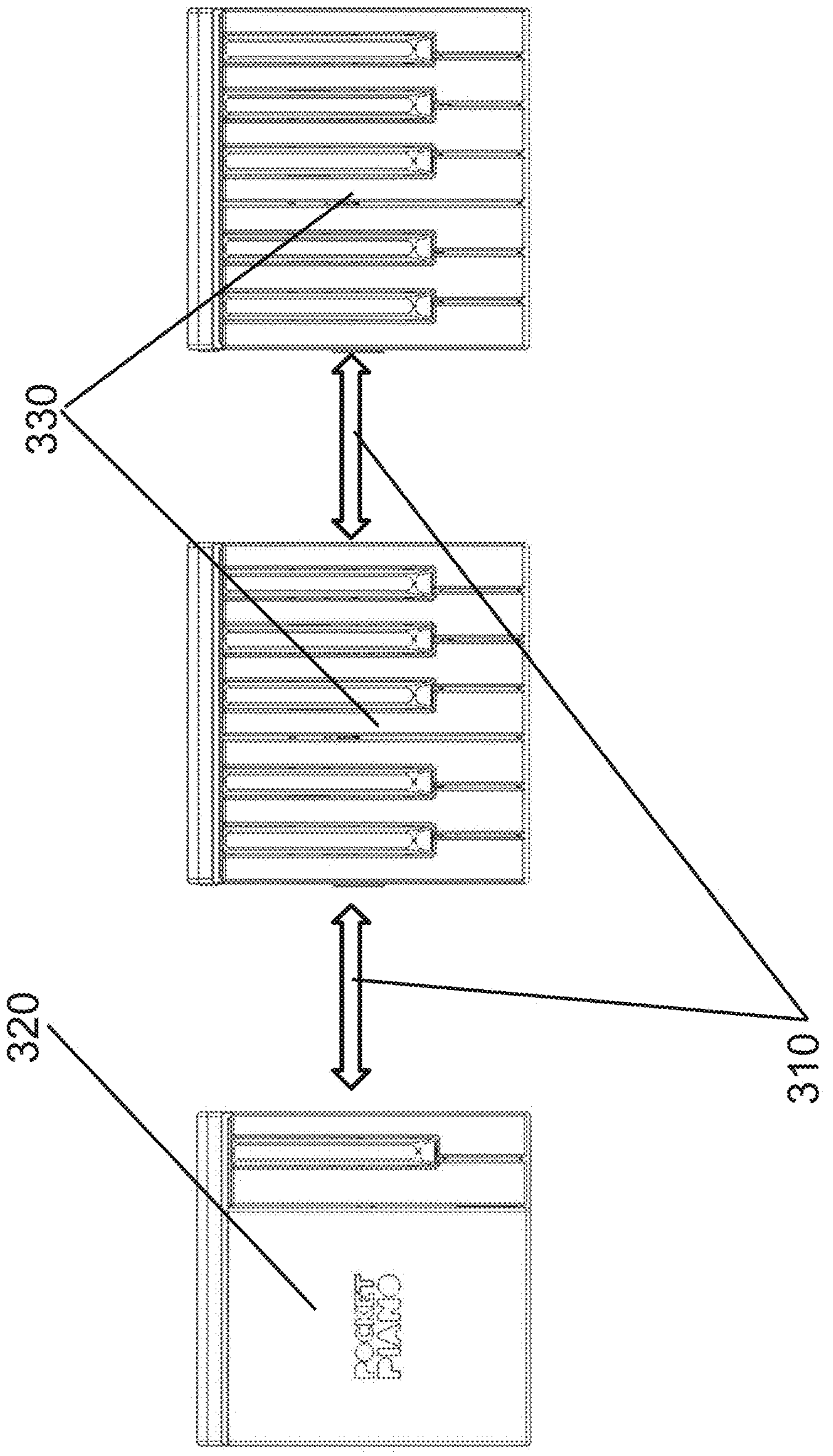
FIG. 3 shows the connection of different keyboard modules by means of magnetized connectors according to an aspect of the invention, wherein there is a 3-key master module connected by means of magnets to two keyboard modules of 12 keys each.

The sensor module configuration comprises means 140 for removably connecting 310 to other sensor modules, as depicted in FIG. 3. For example, when the sensor module is a keyboard module, several modules may be connected contiguously, to form a seven or eight octave piano. In this aspect, a complete twelve-key module is depicted together with a master module comprising three keys, to form an 87-key piano customarily played by classical pianists. In one aspect the connecting means is a magnetized connector, or magnet, which attracts and couples a first module to a second module by aligning the respective magnets of the two modules. In this aspect connecting and disconnecting, or mounting and dismounting, or assembling or disassembling, the piano is facilitated, as it requires little expertise and strength, providing a very versatile and intuitive keyboard module for novice users regardless of age or knowledge of state-of-the-art electronic devices.

Figure 4:
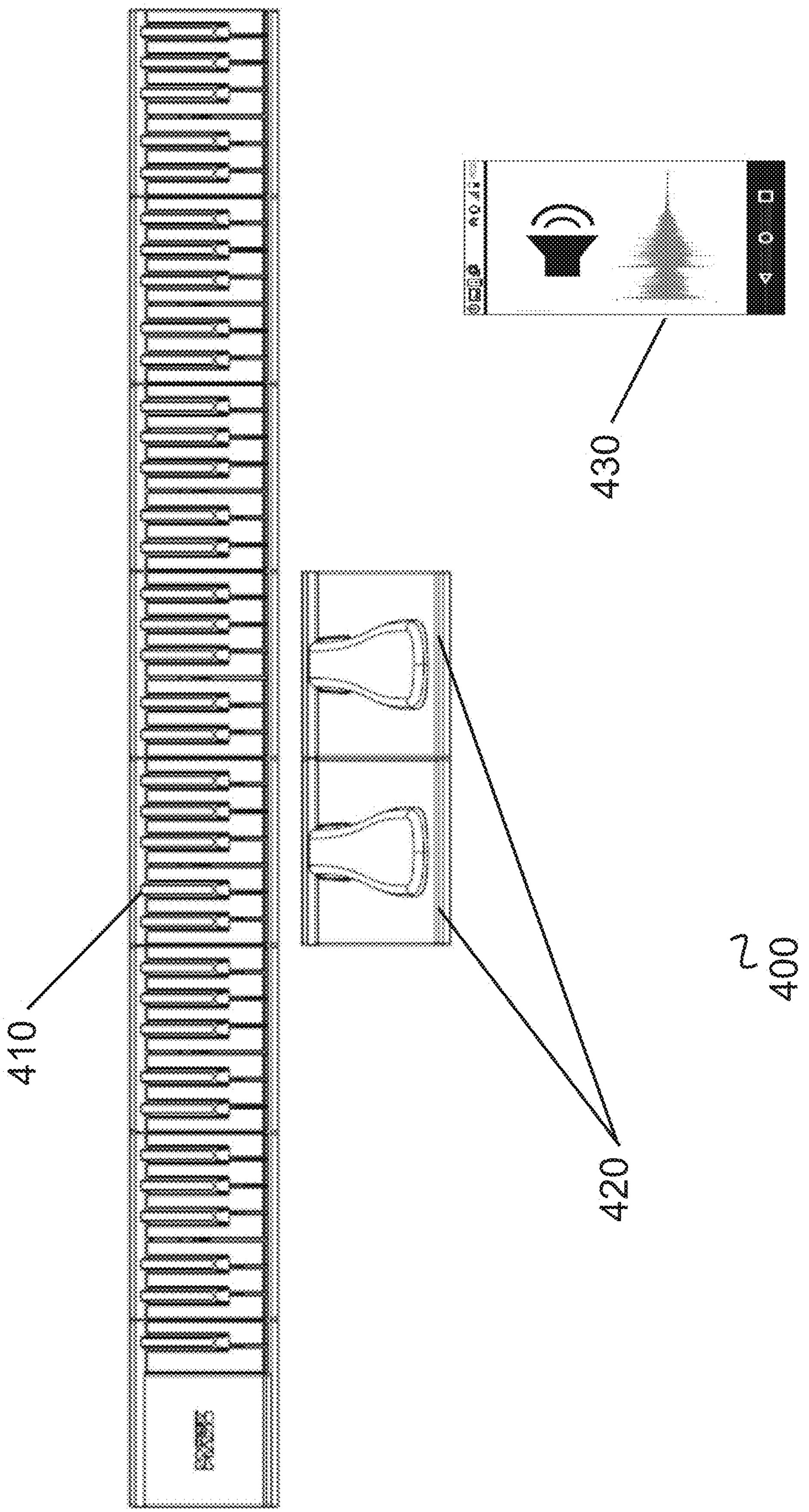
FIG. 4 shows a module system representing a seven-octave, two-pedal piano, wherein the master module comprises 3 keys, forming the 87-key classical piano.

FIG. 4 shows a module system 400 that, when assembled, plays an 87-key piano 410 and two pedals 420. The modularity of the sensor module design allows for a variety of different configurations, from playing only one octave of piano with no pedal, to playing seven octaves of piano with two pedals, or even more modules for experimental musicians. In the latter configuration the 430 mobile application is configured to activate more notes than usually present in eight octaves.

The configuration of the processing means 130 comprises generating a signal comprising parameters defining various aspects of the push button activation. This data may simply represent the pressing, or not, of the push button, and/or a pressing intensity, and/or a pressing delay, and/or a pressing speed. In the case of the keyboard module, the processing means are configured to generate a signal indicative of the note represented by the push button according to its position on the keyboard module. The information generated by the sensor module also comprises an identifier that makes it possible to locate the keyboard module in a chain of modules, and thus to allow determination of which octave it represents. In one aspect, a musical dynamics parameter is also conveyed which helps to produce a feeling of playing a real piano, among other features of the invention. The signal is sent in BLE-Midi format, although the skilled artisan can program the module outputs in any other format used by the mobile application, which is responsible for decoding the received signal into sound. The application can also reside on a dedicated computer or server, although it is expected that users will prefer it in the application format of wireless mobile devices.

The sensor module configuration comprises communication means 150 for transmitting the signal generated by the sensor module processing means to a computer application 430 external to the sensor module. This transmission is accomplished via a wired connection, such as a cable or physical connector, or wirelessly. The skilled artisan is familiar with the various wired and wireless connection modalities, along with their protocols, without needing to provide further details in this disclosure. Examples may include connectivity via USB, Wi-Fi, Bluetooth, and so on.

By means of the communication means, the sensor module communicates with other modules forming a module system. In this case, the processing means are configured to determine the position of the module and assign it as master module 320 if it is located further to the left in the module chain, or assign it as slave module 330 if it is not located further to the left in the module chain. In the case of the three-key master module, this would always be the leftmost master module. The master module is configured to automatically assign all sensor modules their corresponding note according to their position in the connected system of keyboard modules. To faithfully reproduce a piano, depending on the number of connected keyboard modules (octaves), the notes are determined so that the center of the entire keyboard comprises the C CENTRAL note, in the case of an 88-key piano.

The computer application comprises means of communication for receiving and processing the signal to extract the information contained therein. The information further comprises other parameters depending on whether it comes from a keyboard module or a pedal module. The software application is responsible for translating the information and parameters received to reproduce the function of the module from which the information in question originates. Finally, the software application reproduces sounds and/or visual representations of the user's actions.

In the case of the keyboard module, the software application is configured to reproduce, via output interfaces, the sound represented by the keystrokes of the sensor module in question. On the one hand, the output interface is a loudspeaker to reproduce the sound of music. On the other hand, the output interface is a display to reproduce the note visually on a graphical user interface GUI. In the case of the pedal module, the software application is configured to reproduce the different functions according to the position of the pedal and to reproduce this effect together with the sound of the pressing and/or also visually.

In one aspect, when only one keyboard module is activated, it automatically connects to the computer application and can be played as a piano octave. The usefulness of this aspect is that it allows one-handed piano practice, for example, playing the part of the score that is for the right hand, or the left hand. It also allows you to play by placing the keyboard module on a very small surface, for example, some folding tables on airplanes or trains, which are usually very small. In another aspect, when two keyboard modules are connected, they communicate with each other to determine, according to their connection position, which is the master module and which is the slave module. Subsequently, the master module automatically connects to the computer application and both modules can be played as two piano octaves. In another aspect, when the master module has three keys, it is the master module that connects to the software application and also to two other modules. Apart from allowing the two modules to be mounted on a reduced surface, this configuration makes it possible to practice the piano by playing pieces whose notes, or part of them, are contained in only two octaves, without having to keep in mind the other octaves whose notes are not played in the piece of music in question. In the same way, more keyboard modules can be connected, and complete the eight octaves of a real piano, if desired.

In the case of the pedal module, the function reproduced is that of a real grand piano pedal. In one aspect, when a single pedal module is activated, the pedal module automatically connects to the computer application and can be played as the right resonance pedal of a real piano. In another aspect, when two pedal modules are connected, they communicate with each other to determine, according to their connection position, which is the master module and which is the slave module. Subsequently, the master module automatically connects to the software application and can be played as two piano pedals, the left one playing the unicord or sostenuto pedal depending on the configuration via the software application, while the right one plays the resonance pedal. In another aspect, when three pedal modules are connected, they communicate with each other to determine, according to their connection position, which is the master module and which are the slave modules. The master module then automatically connects to the software application and can be played as three grand piano pedals, the left one playing the unichord pedal, the right one playing the resonance pedal, while the center one plays the sostenuto pedal. The software application is configured to make it easy for the skilled artisan to modify the configuration of the pedals, for example, by changing their functionalities to those of an upright piano.

The versatility in the assembly of the modular system even allows the user to determine what type of keyboard he or she wants to play. In one aspect, an organ can be emulated by assembling multiple octave rows and multiple pedals. The computer application would receive information about the configuration of the master module assembly, both the rows of keyboard modules and the pedal module, and would trigger playback of the organ sound according to the position of the module, both within the module chain and according to which row it is in. In another aspect, in case of an experimental musician, even more than seven octaves or more than three pedals can be connected, as long as the music player of the software application is configured to translate so many notes to musical representations, either sonorous or visual.

In one aspect, the sensor module configuration comprises charging means 160 for storing electrical power and driving the other components of the module. The charging means may be a rechargeable battery, and may be recharged via a wired or wireless connection. In the preferred configuration, only the master module comprises charging means and this module serves electrical power to the other modules. This reduces the weight of the overall assembly of modules, facilitating their transport on the transporter.

Figure 11:
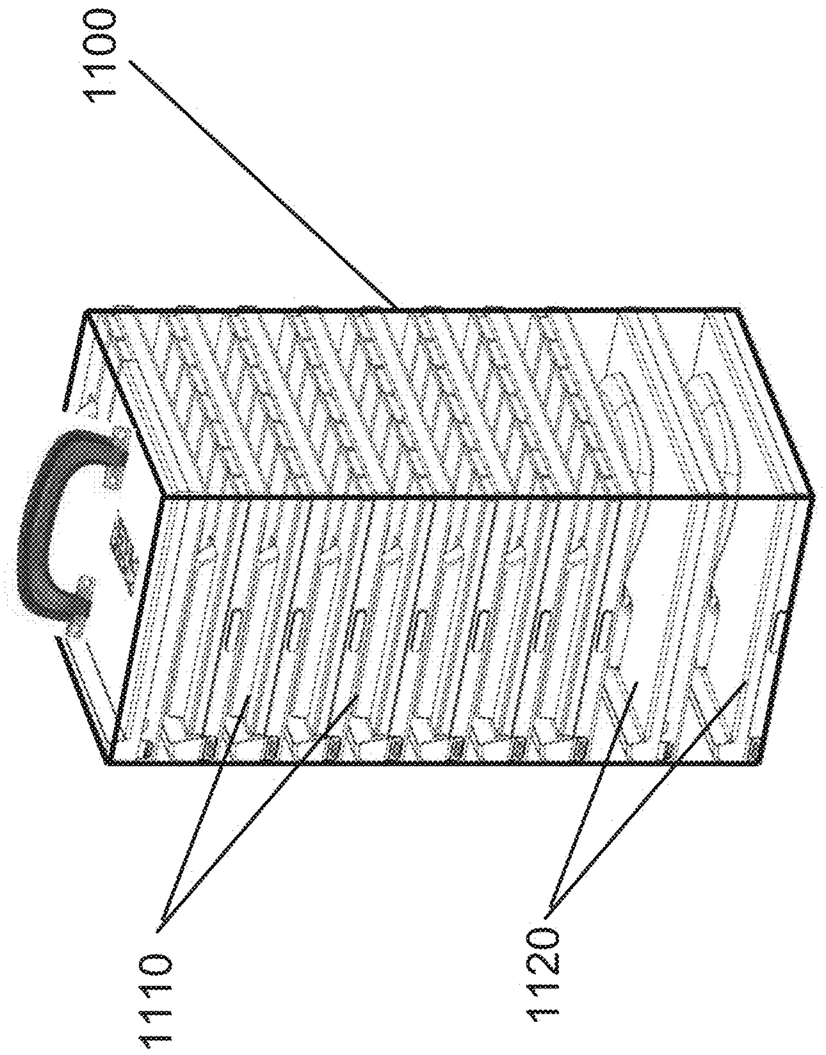
FIG. 11 shows the transporter of the module system according to an aspect of the invention.

FIG. 11 shows a transporter of the module system according to one aspect of the invention. The transporter 1100 is configured to receive and accommodate each of the sensor modules 100 separately, stacked vertically, although other configurations are possible. In this way, the entire piano can be easily transported with the corresponding pedals. In this figure, the transporter is configured to accommodate eight keyboard modules 1110 and two pedal modules 1120.

The transporter also comprises charging means for charging each of the sensor modules housed therein. In the preferred configuration, the transporter is configured to charge only one master keyboard module and one master pedal module, as these then charge the other keyboard and pedal modules to which they are physically connected. The transporter also comprises an electrical connector for connecting a cable with plug for plugging into the mains power supply. In another aspect, both the charging means of the transporter and the charging means of the sensor modules are configured for wireless charging. Even in another aspect it is only the keyboard master module and the pedal master module that are charged as these transfer the necessary charge via their connections to the other slave modules, respectively.

Figure 7B:
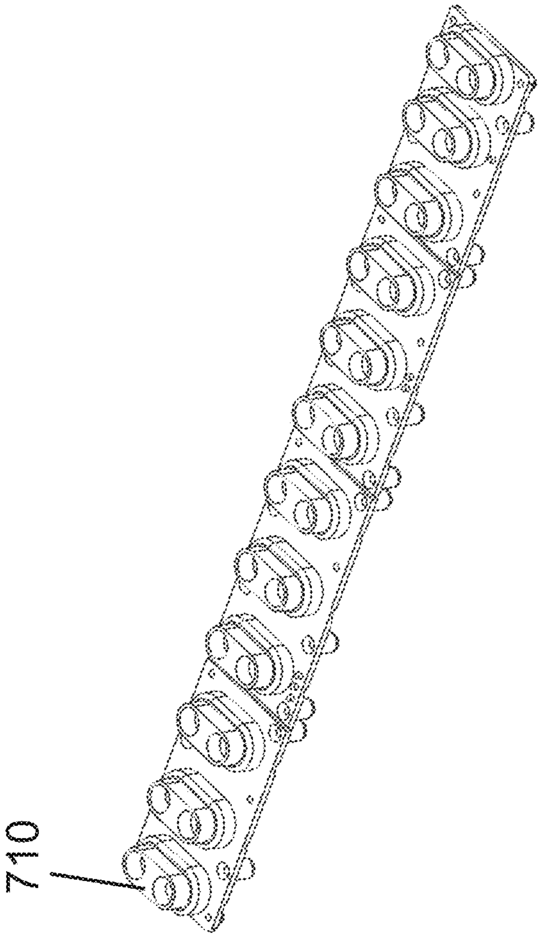
FIG. 7B shows a top view of a membrane of the sensor module according to another aspect of the invention.
Figure 7A:
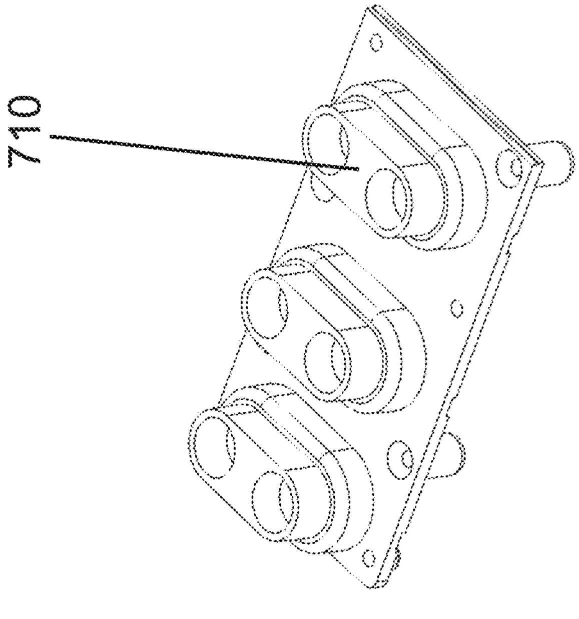
FIG. 7A shows a top view of a membrane of the sensor module according to an aspect of the invention.

FIG. 7A and FIG. 7B each shows the membrane of the sensor module configured from a sheet of silicone. FIG. 7A (on the left) shows the membrane of the pedal module, while FIG. 7B (on the right) shows the membrane of the keypad module. This drawing depicts the upper portion of the membrane which is in contact with the push button. The membrane comprises a plurality of protrusions 710 configured to deform when pressed by the push button, such as when the user presses a key or a foot pedal. In an example practical implementation, in the case of the keyboard module, each protrusion corresponds to a key, while for the pedal module, three protrusions correspond to a pedal. The advantage of having three protrusions is that, being horizontally arranged, it gives more sensitivity or modulating capability to each pedal. The skilled artisan can configure a different number of protrusions according to the degree of sensitivity required.

Figure 8B:
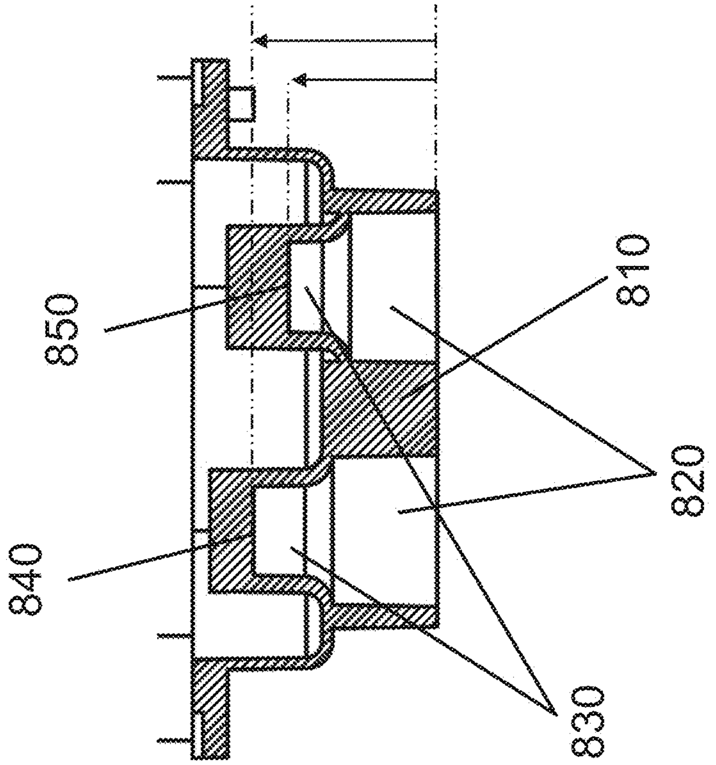
FIGS. 8A and 8B show a bottom view of a membrane of the sensor module according to an aspect of the invention.
Figure 8A:
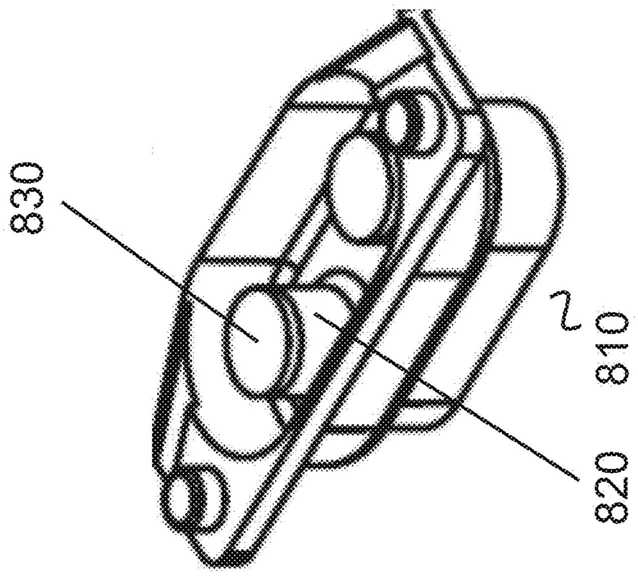

FIG. 8A shows the underside of a protrusion (e.g., protrusion 710) of the membrane of the sensor module that contacts the processing means when pressed. FIG. 8B shows a longitudinal cutaway perspective of the protrusion, in which the two stages of different lengths (indicated by arrows of different lengths) can be seen. Each protrusion comprises a deformable section 810 housing two buttons 820 with graphite terminations 830. On the same projection a first button is longer than the second button. This allows each protrusion to be configured to deform in two stages depending on the pressure level. If the pressure is low, a first stage 840 of the projection is deformed. As the pressure increases, the second stage 850 of the protrusion is also deformed. This is achieved since the boss is configured with the first stage 840 longer than the second stage 850.

The membranes of both the sensor module and the pedal module are arranged in such a way that the first stage is closest to the connected (not loose) end of the push button. Depending on the distance of the protrusions from the connected end of the push button, and the length of the first stage, a safe keystroke distance is defined, in which, if a key is pressed by mistake, no contact is made between the first stage and the electrical circuit of the base, and therefore no signal is generated. Typically, this distance is configurable, in order to enable the sensing of light keystrokes by the musician/user when playing the keys.

The processing means are configured to measure the time between activation of the first stage 840 and activation of the second stage 850 at a predefined sampling interval. By considering the difference in the distance between the two stages, together with the time it has taken for the second stage to activate after the activation of the first stage, the keystroke rate is determined, which is used to represent the range of musical dynamics typically performed by a piano player.

Figure 6:
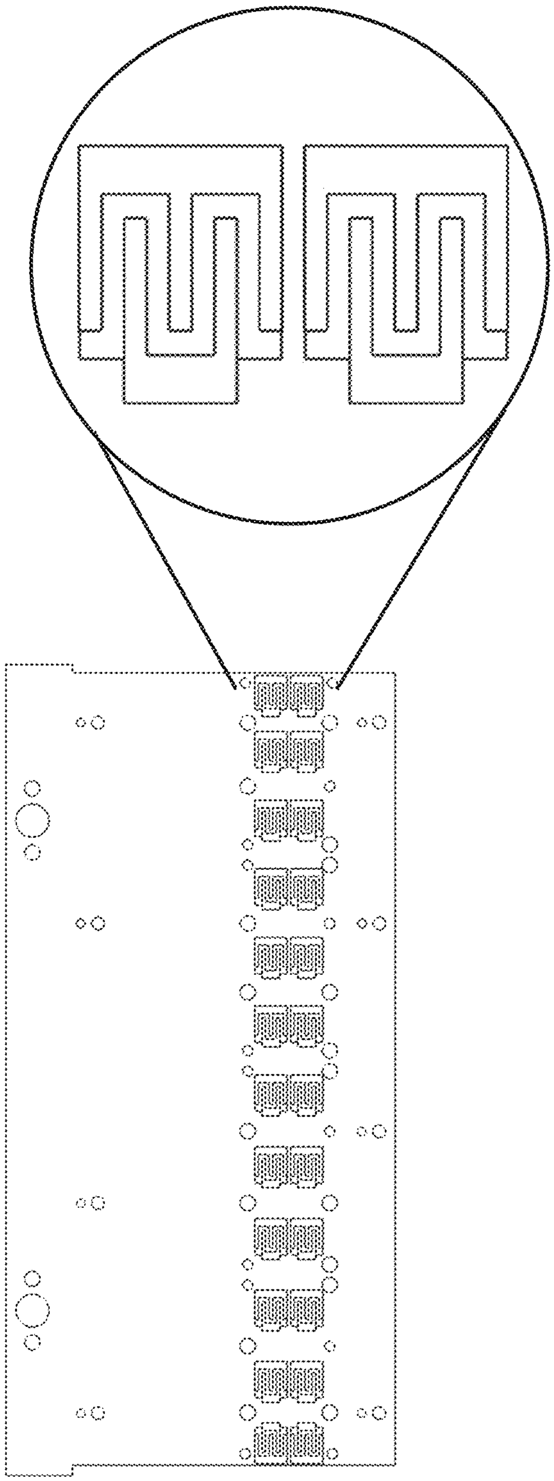
FIG. 6 shows part of the processing means according to one aspect of the invention, wherein the means contacting a push button once pressed are depicted enlarged.

FIG. 6 shows part of the circuitry of the processing means of the keyboard module according to one aspect of the invention, and the enlargement shows two electronic circuits, each is held open by default, and when the push button is pressed, the graphite of each of the protruding stages closes the corresponding circuit, outputting a signal to the processing means. Once the graphite of a button contacts the sensor circuit, the latter closes, sending a contact signal. The enlargement depicts two sensor circuits configured to sense the contact of each of the two buttons belonging to the same protrusion.

The configuration of two protrusion stages allows the push button to sense a variety of intentions of the user of the module, allowing it to provide a more realistic and closer, that is, more faithful, experience to that of a real piano. The piano keys can be played at different speeds, which are rated up to 16 levels (from slowest to fastest: grave, largo, lento, larghetto, adagio, adagietto, andante, andantino, moderato, allegretto, allegro, vivo, vivace, presto, vivacissimo, prestissimo). In addition, the percussive force, or musical dynamics, can be modulated and is classified in up to 10 levels (from weakest to strongest: pianississimo, pianissimo, piano, mezzopiano, mezzoforte, forte, fortissimo, fortississimo, sforzando, piano forte).

The sensor module is configured to faithfully represent musical dynamics to better reproduce the musical experience of a real piano. This is achieved by generating and transmitting at least two parameters. The first key parameter identifies the number of the key being pressed within an octave. The second dynamics parameter represents the user's intention when pressing the sensor.

The dynamics parameter is transmitted, in one aspect, according to values ranging from 0 to 127, following the Midi format. Thus, up to 128 different levels of granularity, or sensitivity, can be defined, configurable to the user's taste. The sampling time can also be configured between 10 ms and 500 ms as well as the sensitivity setting.

In the case of the keyboard module, the various speeds are determined by the frequency of keystrokes by the user, and are directly represented by the detection of at least the first protrusion stage, which is deformed so that a signal is output.

The second dynamics parameter is determined from the time between the deformation of the first protrusion stage and the second protrusion stage, or the difference between the two deformations of the stages, and is given by a range extending between the maximum time (if the first stage deforms, but the second stage never deforms in a sampling interval represented by nine time sections) and the minimum time (if the deformation of the second protrusion stage immediately follows the deformation of the first protrusion stage, separated by two time sections). This time range is defined in nine sections to represent the first nine musical dynamics. The last one, which represents the combination of starting with a soft keystroke and ending with a hard keystroke, is determined in two sampling intervals.

As the user plays the keys, depending on the number of time sections elapsing from the deformation of the first and second stage protrusions, the processing means determine which dynamics were intended to be played following one of the ten musical dynamics mentioned above. Table 1 shows the different combinations and which musical style or dynamics they represent:

TABLE 1

| Musical dynamics | | | |
|---|---|---|---|
| Sampling interval n (10 sections) | | Sampling interval n + 1 (10 sections) | |
| Difference in time sections | Musical dynamics | Difference in time sections | Musical dynamics |
| 10 | Pianississimo | 4 a 1 | Piano Forte |
| 10 | Pianississimo | 10 | Pianississimo |
| 9 | Pianissimo | 9 | Pianissimo |
| 8 | Piano | 8 | Piano |
| 7 | Mezzopiano | 7 | Mezzopiano |
| 6 | Mezzoforte | 6 | Mezzoforte |
| 5 | Forte | 5 | Forte |
| 4 | Fortissimo | 4 | Fortissimo |
| 3 | Fortississimo | 3 | Fortississimo |
| 2 | Sforzando | 2 | Sforzando |

Figure 9:
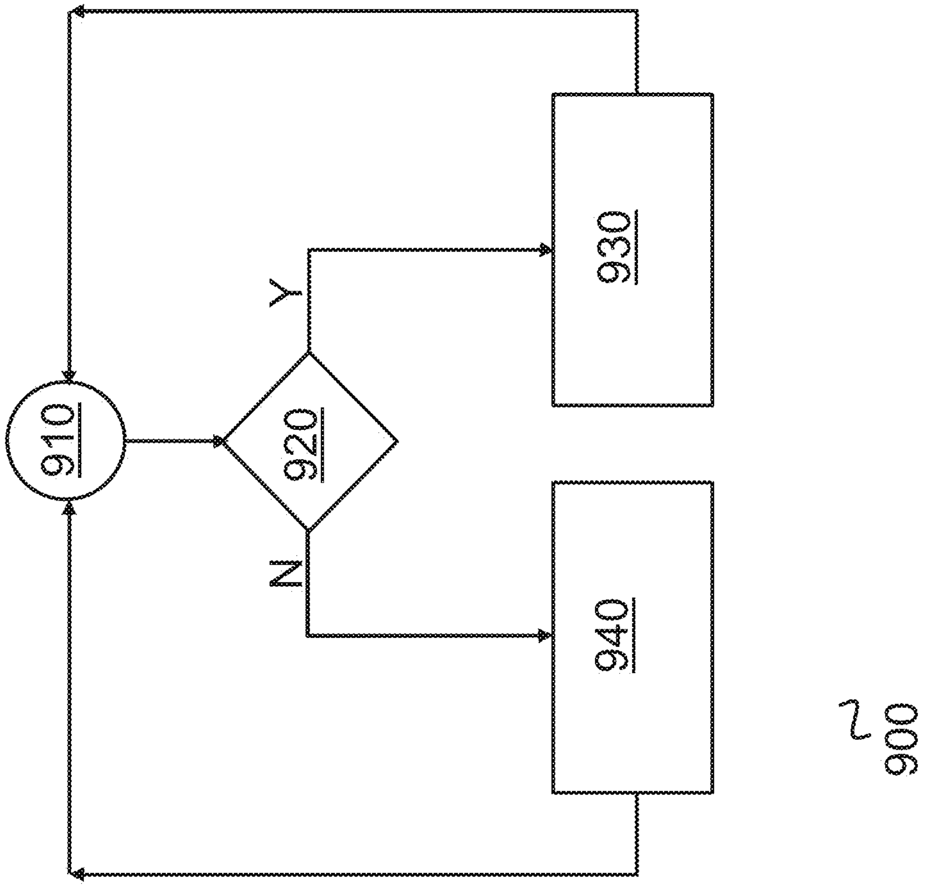
FIG. 9 shows a method of determining push button states according to an aspect of the invention.

FIG. 9 shows a method of determining push button states according to an aspect of the invention. The method 900 begins by determining 910 that at least one push button has been pressed to such an extent that the first stage of the corresponding membrane has been deformed. At this point the first parameter identifying the key pressed in the octave in question is generated. Next, it is determined 920 whether, within a predetermined time interval equivalent to a sampling interval, both stages have been deformed. If so, the signal indicating the musical dynamics according to Table 1 is generated 930 from the described keystroke speed. For example, if the time difference between the deformation of both protrusion stages corresponds to four time sections in a first sampling interval, it is determined that the user has pressed strongly, equivalent to a fortissimo musical dynamics. Otherwise, only the first stage has been deformed in that sampling interval and the signal indicative of a musical dynamic equivalent to pianississimo is generated. Time is then allowed to elapse until the beginning of the next sampling interval thereby returning to the first keystroke detection stage 910.

If in the first half of the next sampling interval, it is determined that the second stage has been deformed without detecting the deformation of the first stage, with a time delay between 4 and 1 time sections from the beginning of the next sampling interval, this combination is interpreted as the intention to play a musical dynamic equivalent to a piano forte, which starts with a soft keystroke and ends with a very strong keystroke of the same note. Otherwise, the iterative algorithm returns to the beginning of an iteration, by determining 910 again whether a first stage has been deformed.

Therefore, the processing means are configured to determine the level of intensity or pressure felt by the push button by determining the time interval between the contact made by the second push button relative to the first. If in a predetermined period, the interval between the two contacts is short, a high pressure is determined. Conversely, if in the predetermined period, the interval between the two contacts is longer, a lower pressure is determined. Depending on the duration of the interval, a signal indicating one of the ten different pressure levels is generated. This signal is received by the software application which translates the user's intentions accordingly. By having ten levels configured, this allows for a close match with the performance of classical music pieces that have a high range of different keystroke intensities. However, as indicated, these 10 levels are implemented by means of 128 different logical states, so that the number of levels can be increased up to 128 according to the user's wishes.

In another aspect, a sampling period of P ms is defined consisting of ten intervals of P/10 ms. At the same time, an increasing intensity level is assigned, starting with the minimum intensity level 1 when the time interval between the two contacts is equal to or greater than 0.9*P ms and less than 1*P ms, a higher intensity level 2 when the time interval between the two contacts is equal to or greater than 0.8*P ms and less than 0.9*P ms, a higher intensity level 3 when the time interval between the two contacts is equal to or greater than 0.7*P ms and less than 0.8*P ms, a higher intensity level 4 when the time interval between the two contacts is equal to or greater than 0.6*P ms and less than 0.7*P ms, a higher intensity level 5 when the time interval between the two contacts is equal to or greater than 0, 5*P ms and less than 0.6*P ms, a higher intensity level 6 when the time interval between the two contacts is equal to or greater than 0.4*P ms and less than 0.5*P ms, a higher intensity level 7 when the time interval between the two contacts is equal to or greater than 0.3*P ms and less than 0.4*P ms, a higher intensity level 8 when the time interval between the two contacts is equal to or greater than 0.2*P ms and less than 0.3*P ms, a higher intensity level 9 when the time interval between the two contacts is equal to or greater than 0.1*P ms and less than 0.2*P ms, and a maximum intensity level 10 when the time interval between the two contacts is equal to or greater than 0.01*P ms and less than 0.1*P ms.

Figure 10:
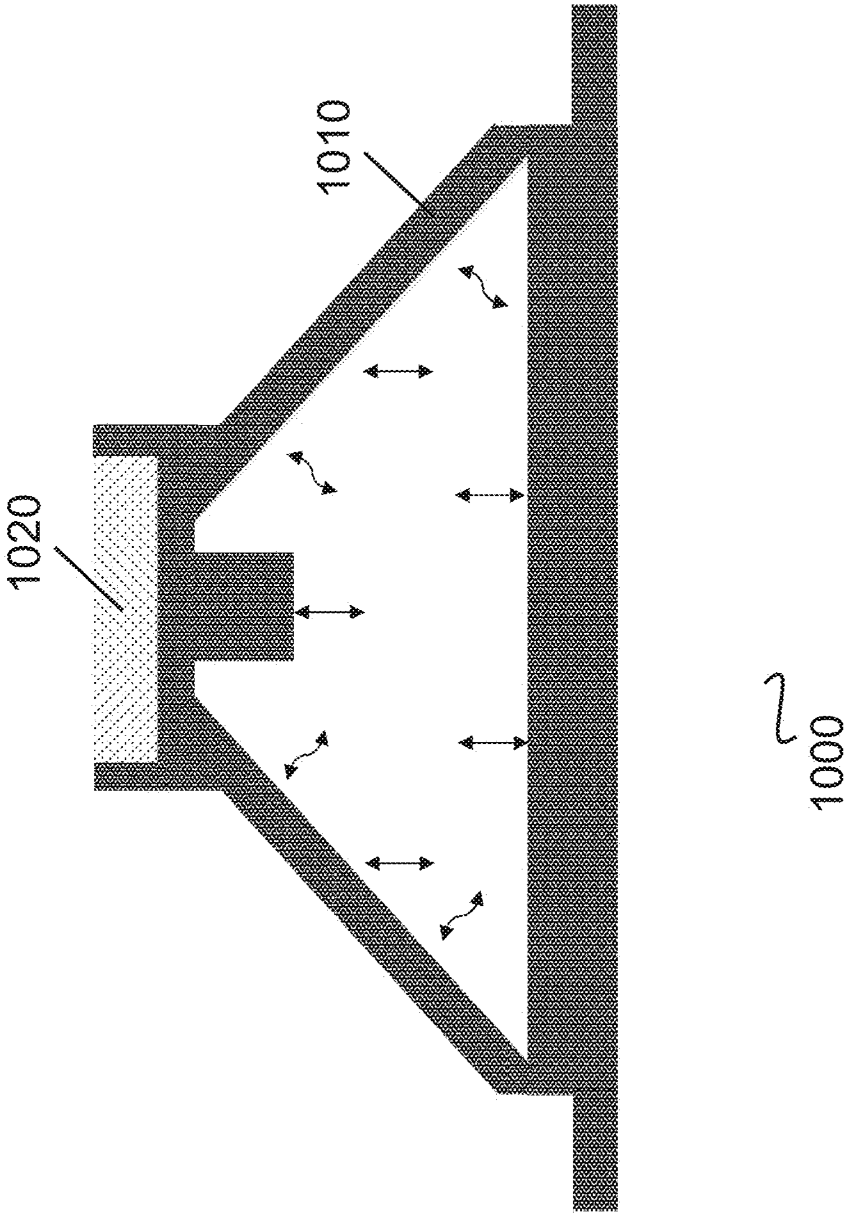
FIG. 10 shows a resistance unit of the sensor module according to an aspect of the invention.

To bring the user experience to that of a real piano even further, resistance elements designed to replicate the sensation of playing the keys of a real piano are configured. FIG. 10 shows a resistance unit 1000 of the sensor module according to one aspect of the invention. The resistance unit comprising a deformable body 1010 of rather rigid material configured in the shape of a cone with a wide base, and is formed in the same membrane. When the key is pressed, the resistance unit gradually deforms (indicated by the arrows) up to its maximum deformation, such that it generates a higher resistance to beat at the beginning before collapsing. The graphite contact 1020 is the one that makes contact with the corresponding part of the underlying processing means, closing the circuit and triggering the generation of the corresponding signal.

The height of the resistance unit is configured to reproduce the stroke of a real piano key and generate a sensation of playing a real key for as long a stroke as the user chooses to play, either by a light, quick touch, such as a staccato, or a powerful, intense pressure, such as a blow, or a smooth, continuous keystroke, such as when playing the last note of a piece. Given its height, the resistance unit, deformed many times over time, instead of deforming gradually, begins to give way and collapse, and therefore, loses fidelity in its function. To solve this problem, in another aspect of the invention, a resistance unit has been developed with deformable inner grooves, allowing a high deformation path like a real key, but at the same time it does not collapse but rather uniform deformation even when the material starts to wear out due to an elevated use is ensured.

Therefore, the various aspects of the invention described above make it possible to enhance the user experience of playing the piano by providing a modular piano keyboard based on sensor modules that can be assembled as piano octaves and/or as piano pedals, that are automatically configured using a computer application to reproduce the sound, and that have various features that in combination provide the feel and sound quality of a real piano, unlike prior art electronic keyboards that are designed to reproduce hundreds of different instruments, and do not reproduce the feeling of either playing a real piano or listening to a musician perform a piece composed for a real piano because they do not allow the musician to express himself as he does with a real piano.

It is further understood that the described embodiments and aspects may be implemented by various means in hardware, software, firmware, middleware, microcode, or any combination thereof. Various aspects or features described may be implemented, on the one hand, as a method or procedure or function, and on the other hand, as an apparatus, device, system, or computer program accessible by any computer-readable device, carrier, or medium. The described procedures or algorithms can be implemented directly in hardware, in a software module executed by a processor, or a combination of the two.

The various means may comprise software modules resident in RAM memory, flash memory, ROM memory, EPROM memory, EEPROM memory, registers, hard disk, removable disk, a CD-ROM, or any other type of storage medium known in the art.

The various means may comprise logic blocks, modules, and circuits may be implemented or carried out by a general purpose processor, a digital signal processor (DSP), an application specific integrated circuit (ASIC), a field programmable gate array (FPGA), or other programmable logic, discrete gate or transistor logic devices, discrete hardware components, or any combination thereof designed to carry out the described functions. A general purpose processor may be a microprocessor, but alternatively, the processor may be a conventional processor, controller, microcontroller, or state machine.

The various means may comprise computer-readable means including, but not limited to, magnetic storage devices (for example, hard disks, floppy disks, magnetic strips, and the like), optical disks (for example, CD compact disks or versatile DVDs, and the like), smart cards, and temporary flash storage drives (for example, EPROM, pen card, key drive, and the like). Additionally, the described array of storage media may represent one or more computer-readable devices and/or means for storing information. The term computer-readable medium may comprise, without being limited thereto, a variety of means capable of storing, saving, or transporting instructions and/or data. Additionally, a computer program product may comprise a computer-readable medium with one or more instructions or operating codes for causing a computer to perform the described functions once executed on the computer.

What has been described comprises one or more embodiments by way of example. It is of course not possible to describe every conceivable combination, or permutation, of the components and/or methodologies for the purpose of describing the aforementioned embodiments. Instead, the skilled artisan will realize that many other combinations and permutations of various realizations are possible within the inventive concept after a direct and objective reading of this disclosure. Accordingly, it is intended to embrace all such alterations, modifications and variations that fall within the scope of the appended claims.

In the following, certain additional aspects or examples are described: A sensor module, configurable as a piano keyboard module or a piano pedal module, for faithfully reproducing a piano, the sensor module comprising: at least one push button; at least one processing means configured for generating a signal indicative of the musical dynamics performed when the push button is pressed; and at least one membrane positioned between the push button and the processing means, the membrane configured to deform under the effect of the push button pressure once the pressure exceeds a threshold.

The module, further comprising communication means configured for communicating with other sensor modules forming a sensor module system. The module, wherein the processing means are configured to determine the position of the module and assign itself as master module if it is located leftmost or assign itself as slave module if it is not located leftmost. The module, wherein the communication means of the master module are configured for communicating with a software application. The module, wherein the processing means are configured for generating the signal indicative of the musical dynamics of the push button, comprising a first parameter identifying the push button among a plurality of push buttons, and a second parameter defining a pressing intensity and/or a pressing delay and/or a pressing velocity and/or a pressing pressure. The module, wherein the at least one membrane is configured with two protrusions of different lengths to deform in two stages, and wherein the processing means are configured for generating the signal based on the deformation of the protrusions. The module, wherein each protrusion is a resistance unit formed in the same membrane comprising a cone-shaped deformable body with a broad base. The module, wherein the at least one processing means are configured to determine nine different musical dynamics as a function of the time elapsed between the contact of the first protrusion stage and the second protrusion stage within a particular sampling interval. The module, wherein the at least one processing means are configured to determine the musical dynamics corresponding to piano forte as a function of the time elapsed between the contact of the first protrusion stage in a first sampling interval and the time elapsed until the contact of the second protrusion stage in a second sampling interval. The module, wherein the sensor module is a piano keyboard module comprising twelve push buttons and twelve corresponding membranes are configured to detect the pressing of the respective push buttons, and wherein the processing means are configured to generate a signal indicative of the note represented by the push button based on its position on the keyboard module. The module, wherein the sensor module is a piano pedal module comprising a push button and at least three corresponding membranes are configured to detect the pressing of the push button.

A method in a sensor module, configurable as a piano keyboard module or a piano pedal module, for faithfully reproducing a piano, the sensor module comprising at least one push button, at least one processing means, and at least one membrane positioned between the push button and the processing means, the method comprising generating a signal indicative of the musical dynamics performed when the push button is pressed by deforming the membrane under the effect of the push button pressure once the push button pressure exceeds a threshold.

The method, further comprising communicating, by means of communication means, with other sensor modules forming a sensor module system. The method, comprising determining, by the processing means, the position of the module and assigning itself as master module if it is located leftmost or assigning itself as slave module if it is not located leftmost. The method, comprising the communication means of the master module communicating with a software application. The method, comprising generating the signal indicative of the musical dynamics of the push button with a first parameter identifying the push button among a plurality of push buttons, and a second parameter defining a pressing intensity and/or a pressing delay and/or a pressing velocity and/or a pressing pressure. The method, wherein the signal indicative of the musical dynamics is generated based on the deformation in two stages of two protrusions of different lengths of at least one membrane. The method, comprising determining nine different musical dynamics as a function of the time elapsed between the contact of the first protrusion stage and the second protrusion stage within a particular sampling interval. The method, upon expiry of a first sampling interval, determining the deformation of the first protrusion stage of the at least one push button, and generating the second dynamics parameter indicative of a keystroke of minimum intensity; whilst the first sampling interval has not expired, determining the pressing of the second stage of the at least one push button after the determination of the pressing of the first stage, and generating the second dynamics parameter indicative of a musical dynamics as a function of the difference in time between the deformation of the two membrane stages. The method, comprising determining the musical dynamics corresponding to piano forte as a function of the time elapsed between the contact of the first protrusion stage in a first sampling interval and the time elapsed until the contact of the second protrusion stage in a second sampling interval. The method, wherein the sensor module is a piano keyboard module comprising twelve push buttons and twelve corresponding membranes are configured to detect the pressing of the respective push buttons, and wherein the processing means are configured to generate a signal indicative of the note represented by the push button based on its position on the keyboard module. The method, wherein the sensor module is a piano pedal module comprising a push button and at least three corresponding membranes are configured to detect the pressing of the push button.

A computer program comprising instructions, once executed on a processor, for carrying out the method steps.

Computer readable medium comprising instructions, once executed on a processor, for carrying out the method steps.

Modular system comprising at least one sensor module configured as a keyboard module.

The modular system, further comprising at least one sensor module configured as a pedal module.

The invention claimed is:

1. A sensor, configurable as a piano keyboard member or a piano pedal member, for transmitting a feeling of playing a real piano, the sensor comprising:

at least one push button;

at least one signal generator configured to generate a signal indicative of musical dynamics performed when the push button is pressed, the signal comprising other parameters depending on whether it comes from a keyboard member or a pedal member; and at least one membrane in contact with the push button and positioned between the push button and the signal generator, the membrane comprising at least one protrusion comprising a first protrusion stage and a second protrusion stage, wherein the first protrusion stage is configured to be longer than the second protrusion stage, thereby enabling each protrusion to deform in two stages under an effect of the push button pressure, wherein the signal generated by the at least one signal generator is indicative of one of a plurality of musical dynamics based on a number of time sections elapsing between the deformation of the two stages within a time interval or between two time intervals.

2. The sensor of claim 1, further comprising a communication interface configured to communicate with other sensors forming a modular sensor system.

3. The sensor of claim 2, wherein the at least one signal generator is configured to determine the position of the sensor and assign itself as a master if it is located leftmost or assign itself as slave if it is not located leftmost, and wherein the communication interface of the master is configured for communicating with a software application.

4. The sensor of claim 3, wherein the at least one signal generator is configured to generate the signal indicative of the musical dynamics of the push button, comprising a first parameter identifying the push button among a plurality of push buttons, and a second parameter defining one or more of a pressing intensity, a pressing delay, a pressing velocity, or a pressing pressure.

5. The sensor of claim 3, wherein the sensor is a piano keyboard member comprising twelve push buttons and twelve corresponding membranes are configured to detect the pressing of the respective push buttons, and wherein the at least one signal generator is configured to generate a signal indicative of the note represented by the push button based on its position on the keyboard member.

6. The sensor of claim 3, wherein the sensor is a piano pedal member comprising a push button and at least three corresponding membranes are configured to detect the pressing of the push button.

7. The sensor of claim 1, wherein each protrusion is a resistance unit formed in the same membrane comprising a cone-shaped deformable body with a broad base, the resistance unit comprising deformable inner grooves.

8. The sensor of claim 1, wherein the at least one signal generator is configured to determine nine different musical dynamics as a function of a time elapsed between contact of a first protrusion stage and a second protrusion stage within a particular sampling interval, the nine musical dynamics comprising pianississimo, pianissimo, piano, mezzopiano, mezzoforte, forte, fortissimo, fortississimo, or sforzando.

9. The sensor of claim 1, wherein the at least one signal generator is configured to determine the musical dynamics corresponding to piano forte as a function of a time elapsed between contact of a first protrusion stage in a first sampling interval and a time elapsed until contact of a second protrusion stage in a second sampling interval.

10. The sensor of claim 1, wherein a safe keystroke distance is configured based on the distance from the at least one protrusion to the connected end of the push button, and the length of the first protrusion stage, thereby preventing accidental keystrokes while still allowing light keystrokes.

11. A method of a sensor that is configurable as a piano keyboard member or a piano pedal member, for transmitting a feeling of playing a real piano, the sensor comprising at least one push button, at least one signal generator, and at least one membrane in contact with the push button and positioned between the push button and the signal generator, the at least one membrane comprising at least one protrusion comprising a first protrusion stage and a second protrusion stage, wherein the first protrusion stage is configured to be longer than the second protrusion stage, thereby enabling each protrusion to deform in two stages under an effect of the push button pressure, the method comprising generating a signal indicative of one of a plurality of musical dynamics based on a number of time sections elapsing between the deformation of the two stages within a time interval or between two time intervals, the signal comprising other parameters depending on whether it comes from a keyboard member or a pedal member.

12. The method of claim 11, further comprising communicating with other sensors forming a modular sensor system.

13. The method of claim 12, comprising determining, by the at least one signal generator, the position of the sensor and assigning itself as master if it is located leftmost or assigning itself as slave if it is not located leftmost, and wherein the master communicates with a software application.

14. The method of claim 13, comprising generating the signal indicative of the musical dynamics of the push button with a first parameter identifying the push button among a plurality of push buttons, and a second parameter defining a pressing intensity and/or a pressing delay and/or a pressing velocity and/or a pressing pressure.

15. The method of claim 13, wherein the sensor is a piano keyboard member comprising twelve push buttons and twelve corresponding membranes are configured to detect the pressing of the respective push buttons, and wherein the at least one signal generator is configured to generate a signal indicative of the note represented by the push button based on its position on the keyboard member.

16. The method of claim 13, wherein the sensor is a piano pedal member comprising a push button and at least three corresponding membranes are configured to detect the pressing of the push button.

17. The method of claim 11, comprising determining nine different musical dynamics as a function of a time elapsed between contact of a first protrusion stage and a second protrusion stage within a particular sampling interval, the nine musical dynamics comprising pianississimo, pianissimo, piano, mezzopiano, mezzoforte, forte, fortissimo, fortississimo, or sforzando.

18. The method of claim 17, comprising:

upon expiry of a first sampling interval, determining the deformation of the first protrusion stage of the at least one push button, and generating second dynamics parameter indicative of a keystroke of minimum intensity; and whilst the first sampling interval has not expired, determining the pressing of the second stage of the at least one push button after the determination of the pressing of the first stage, and generating the second dynamics parameter indicative of a musical dynamics as a function of the difference in time between the deformation of two membrane stages.

19. The method of claim 11, comprising determining the musical dynamics corresponding to piano forte as a function of the time elapsed between the contact of the first protrusion stage in a first sampling interval and the time elapsed until the contact of the second protrusion stage in a second sampling interval.

20. The method of claim 11, wherein accidental keystrokes are prevented while still allowing light keystrokes based on a safe keystroke distance configured based on the distance from the at least one protrusion to the connected end of the push button, and the length of the first protrusion stage.

21. A non-transitory computer-readable medium storing instructions, which when executed by a processor, cause the processor to perform operations including generating a signal indicative of one of a plurality of musical dynamics performed when a push button is pressed by deforming at least one membrane under an effect of the push button pressure, the at least one membrane comprising at least one protrusion comprising a first protrusion stage and a second protrusion stage, wherein the first protrusion stage is configured to be longer than the second protrusion stage, thereby enabling each protrusion to deform in two stages, wherein generating the signal indicative of one of a plurality of musical dynamics is based on a number of time sections elapsing between the deformation of the two stages within a time interval or between two time intervals, the signal comprising other parameters depending on whether it comes from a keyboard member or a pedal member, wherein the push button is part of a sensor that is configurable as a piano keyboard member or a piano pedal member, for transmitting a feeling of playing a real piano, and wherein the membrane is in contact with the push button and positioned between the push button and a signal generator.

22. A modular system comprising one or more sensors, wherein each sensor comprises:

at least one push button;

at least one signal generator configured to generate a signal indicative of one of a plurality of musical dynamics performed when the push button is pressed; and at least one membrane in contact with the push button and positioned between the push button and the signal generator, the membrane configured to deform under an effect of the push button pressure, the at least one membrane comprising at least one protrusion comprising a first protrusion stage and a second protrusion stage, wherein the first protrusion stage is configured to be longer than the second protrusion stage, thereby enabling each protrusion to deform in two stages, wherein generating the signal indicative of one of a plurality of musical dynamics is based on a number of time sections elapsing between the deformation of the two stages within a time interval or between two time intervals, the signal comprising other parameters depending on whether it comes from a keyboard member or a pedal member, and wherein at least one sensor is configured as a keyboard member for reproducing a piano or as a pedal member.

* * * * *